United States Patent

[11] 3,567,866

[72] Inventors Bruce E. Briley
Countryside;
Victor Hachenburg, Naperville, Ill.
[21] Appl. No. 736,171
[22] Filed June 11, 1968
[45] Patented Mar. 2, 1971
[73] Assignee Bell Telephone Laboratories, Incorporated
Murray Hill, N.J.

[56] References Cited

UNITED STATES PATENTS

| | | | |
|---|---|---|---|
| 3,004,108 | 10/1961 | Joel | 179/18 |
| 2,500,289 | 3/1950 | Kessler | 179/16(.4) |

OTHER REFERENCES

Applicant citation Bell Laboratories Record March 1950: " Incoming Register Link for No. 5. Crossbar" page 115 et seq.

*Primary Examiner*—William C. Cooper
*Attorneys*—R. J. Guenther and R. B. Ardis

[54] TRUNK CIRCUIT WITH PULSE DELAY
10 Claims, 6 Drawing Figs.

[52] U.S. Cl. .......... 179/18, 179/16
[51] Int. Cl. .......... H04q 1/32
[50] Field of Search .......... 179/16.4, 1645, 18 (TRK)

ABSTRACT: In an electronic telephone-switching system a trunk circuit is disclosed for connection to incoming trunks from step-by-step telephone-switching systems. The trunk circuit incorporates delay means for delaying all incoming dial pulses for a predetermined period thereby allowing the switching system sufficient time after trunk seizure to establish a connection from the trunk circuit to a dial pulse receiver by means of a switching network.

INVENTORS B. E. BRILEY
V. HACHENBURG
BY John C Albert
ATTORNEY

TRUNK CIRCUIT WITH PULSE DELAY

BACKGROUND OF THE INVENTION

Certain telephone-switching systems, such as the Bell System's No. 5 Crossbar System and No. 1 ESS Electronic Switching System, employ dial pulse registration equipment, shared by a plurality of lines and trunks, for accumulating dial pulse information prior to the utilization thereof by the switching system for the performance of various steps required to complete the call. In other telephone switching systems, such as the step-by-step system, dial pulses are not accumulated but each dialed digit is used to directly control the switches of the system. In such a system the connection progresses through the office as the dialed digits are received.

When to two offices of the type which accumulate dial pulse information prior to the utilization thereof and which share dial pulse registration equipment among a plurality of lines and trunks are connected together, no dial pulse information is transmitted from the originating office until after the corresponding receiving office has connected dial pulse receiving equipment to the trunk over which dial pulse information is to be transmitted. The originating office, upon selection of a trunk to the receiving office, applies a seizure signal which is detected at the receiving office. In response to the detected seizure, the receiving office selects available dial pulse-receiving equipment, establishes a connection from the selected dial pulse receiver to the trunk on which the seizure of was detected, and transmits a signal to the sending office indicating readiness to receive dial pulse information.

When an office, such as step-by-step, is connected to an office of the type which accumulates dial pulse information prior to utilization, a problem arises in that the step-by-step office proceeds with the transmission of dial pulses without waiting for a readiness signal from the receiving office. The first few digits dialed by a subscriber of the step-by-step office are employed to seize an idle trunk to the receiving office. Subsequently dialed digits are transmitted over the seized trunk as the subscriber dials them independently of the readiness of the receiving office. Consequently, some dial pulses may be lost unless steps are taken to compensate for this discrepancy in the interface between the two offices.

Some solutions to the problem are known from the prior art. In the above-noted No. 5 Crossbar System, a so-called "-bylink" is employed to establish a fast temporary connection from the incoming trunk to the dial pulse registration equipment. The bylink connection is broken as soon as a more permanent connection is established through a selected network crosspoint. The bylink arrangement requires special equipment in the office which is obtained at a comparatively high cost. Some electronic switching systems employ high-speed scanning of all incoming trunks from a step-by-step office, at the cost of processor time, to assure registration of all incoming dial pulses. A "stop dial" arrangement has been used by which the calling party is given a tone signal when the called exchange is ready to receive further dial pulse information. This arrangement is very inconvenient to the customer.

Accordingly, it is an object of the present invention to assure the registration of all dial pulses pulses transmitted from a direct progressive system, such as step-by-step, to systems which accumulate dial information prior to utilization and which share dial pulse-receiving equipment among a plurality of lines or trunks, at minimum cost and without inconvenience to the calling party.

Still other prior art systems use special equipment to accumulate the first digit or several pulses of the first digit at the incoming trunk during the time that a connection is established to other dial pulse registration equipment. Subsequent dial pulses are received in the latter dial pulse registration equipment via the established connection. Upon receipt of all the dialed digits, the system must assemble the information from the two sources in order to obtain the number dialed by the customer.

In yet another system a first digit is received and stored in the incoming trunk circuit, and is transmitted to digit registering apparatus during the first interdigital time period. Subsequent digits are stored at the trunk circuit as they are received and are transmitted during the immediately succeeding interdigital time periods.

It is a further object of this invention to simplify the means and method of receiving dial pulse information from a direct progressive telephone-switching system such as step-by-step, in a telephone-switching system which accumulates dial pulse information prior to utilization and which shares its dial pulse registration equipment among a plurality of lines and trunks.

SUMMARY OF THE INVENTION

In accordance with this invention, a delay means is associated with each incoming trunk which is connected to a direct progressive switching system such as step-by-step. All dial pulses received from such a trunk are delayed in the delay means at the incoming trunk by an equal predetermined period of time which is sufficiently long to allow the system to establish a connection from the delay means to a dial pulse receiver without loss or mutilation of any dial pulses. In one illustrative embodiment, the delay means comprises a multistage shift register which is advanced under control of advance pulses generated by an associated pulse source. The delay introduced by the shift register is dependent on the repetition rate of the advance signal. In accordance with this invention, the repetition rate of the advance signal is selectively controlled in order to adjust the delay introduced by the shift register in accordance with the traffic load of the system.

Advantageously, the multistage shift register may be manufactured as an integrated circuit at comparatively low cost. Furthermore, the delay means may be used in conjunction with incoming trunk circuits of the type used for connection to offices other than step-by-step with only minor modification of the trunk circuit.

In accordance with one feature of this invention, seizure signals received from an incoming trunk are utilized to request a connection between the corresponding incoming trunk circuit and a dial pulse receiver, and all dial pulses subsequently received from the trunk are delayed for a predetermined period of time to assure the proper registration of all incoming dial pulses in the selected dial pulse receiver.

In accordance with another feature of this invention, the period of time that the dial pulses are delayed may be increased or decreased in accordance with the traffic load of the system.

It is another feature of this invention that the circuitry for delaying incoming dial pulses may be advantageously fabricated as integrated circuits and may be employed in conjunction with incoming trunk circuits of the type employed for connecting to offices other than step-by-step, with only minor modification of the trunk circuit.

GENERAL DESCRIPTION

In the illustrative embodiment of this invention, a shift register delay circuit is connected to an incoming trunk circuit of an electronic telephone-switching system. The incoming trunk circuit and the electronic switching system referred to are disclosed in the copending Doblmaier et al. application Ser. No. 334,875 filed Dec. 31, 1963. The organization of the principal equipment units of the illustrative embodiment will now be described with reference to FIG. 1. The electronic switching office is designed to serve many types of telephone calls including incoming calls from distant offices to local customers or to other distant offices. The distant offices may be other electronic switching offices, crossbar switching offices, or step-by-step switching offices.

Figure 1:
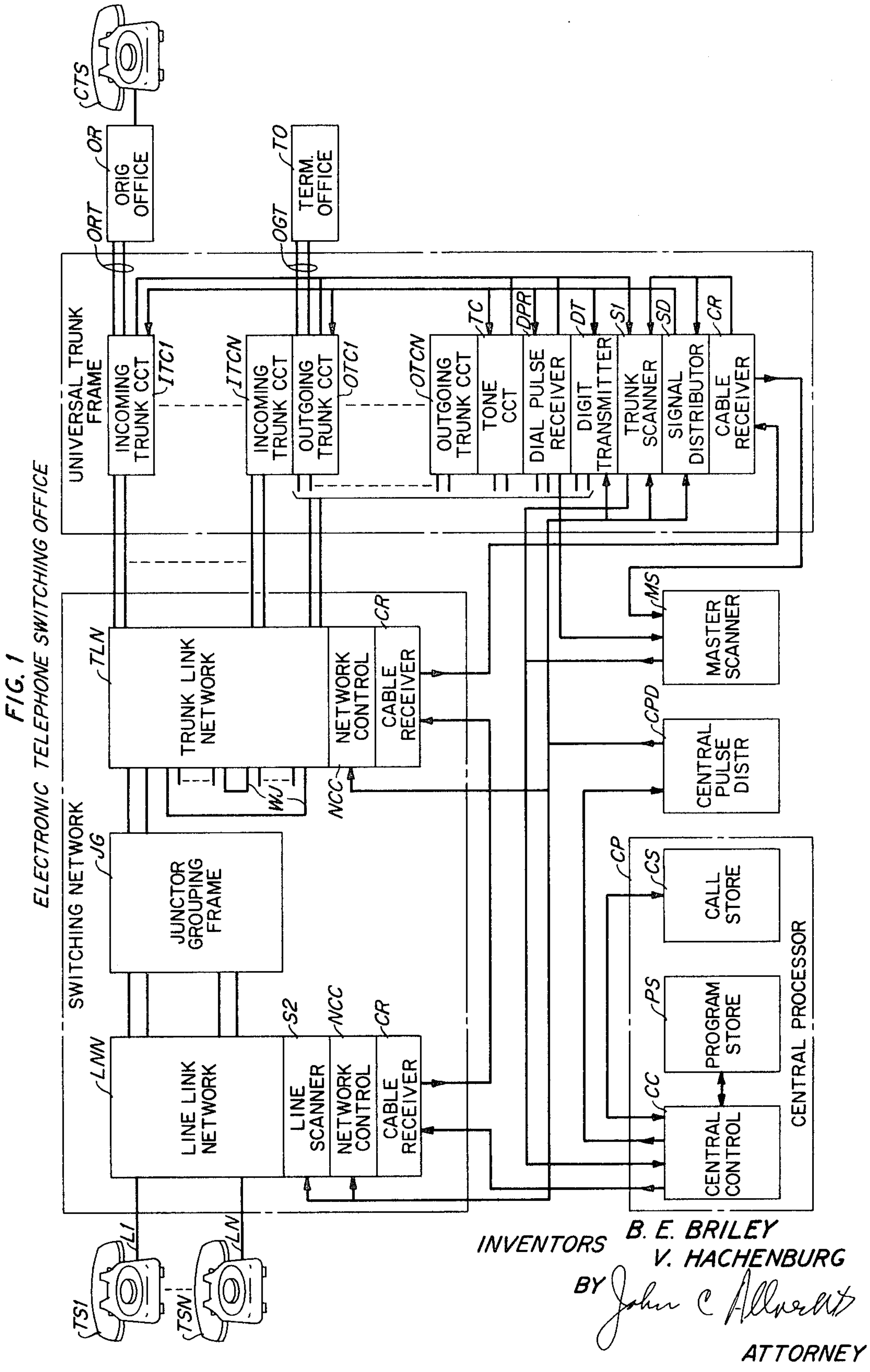
FIG. 1 is a general block diagram of an electronic telephone-switching system.

Distant offices are usually connected by both incoming and outgoing trunks. A distant office from which a call originates is referred to as an originating office, and a distant office to which a call is directed is referred to as a terminating office. Shown in FIG. 1 is an originating office OR connected to an incoming trunk circuit ITC1, via an incoming trunk ORT, and a terminating office TO connected to an outgoing trunk circuit OTC1, via an outgoing trunk OGT. Each of the incoming trunk circuits and outgoing trunk circuits is connected to both the trunk link network TLN and the scanner S1. Subscriber sets TS1—TSN are connected to the line link network LLN and the scanner S2 via subscriber lines L1—LN.

The electronic telephone-switching system is completely controlled by a central processor CP which comprises a program-controlled central control CC, a read only program store PS and a writable call store CS. The program store PS contains permanent information such as the system's operational programs, translation information, class of service information, etc. The call store CS contains information of a more temporary nature such as the operational states of the equipment of the office and the progress of calls being handled by the office. The central control CC by execution of the system's operational programs controls the switching system for providing the telephone service in response to requests originated with incoming trunks and subscriber lines. The scanners S1 and S2 are controlled by the central control CC for the obtaining of service requests from subscriber lines and incoming trunks and information regarding the operational state of the various circuits in the office. In accordance with the system's operational programs, the central control CC causes the scanning operation to be performed periodically. The result of a scanning operation is compared with the previous scanning result of the same equipment, stored in the call store CS, and any change from the previous result is interpreted by the central control CC. In response to a detected change, the central control CC must perform various functions, such as update the call store CS, change the operational state of various circuits in the office, and alter connections in the trunk line network TLN or line link network LLN. The line link network LLN, the trunk link network TLN, the junctor circuits in the junctor group frame JG, and the wire junctors WJ collectively serve to establish various communication paths (e.g., from an incoming trunk circuit to a subscriber line, from an incoming trunk circuit to a dial pulse receiver, etc.) within the office. Establishment of selected connections in the networks LLN and TLN is controlled by means of network controllers NCC associated with the networks. The various individual circuits of the office (e.g., trunk circuits, dial pulse receivers, etc.) are controlled via a signal distributor SD which acts as a buffer between the high-speed central control CC and relatively low-speed relays of the individual circuits. Command signals to the peripheral units of the office, i.e., the network controllers, scanners, and signal distributor, are transmitted from the central control CC via a common bus connected to cable receivers associated with one or more peripheral units. A central pulse distributor CPD generates short duration pulses, including enable pulses for the peripheral units, in response to signals from the central control CC. A peripheral unit (e.g., network controller) is activated only when it receives an enable pulse from the central pulse distributor CPD concurrently with a command signal from the central control CC on the associated cable receiver CR.

Telephone calls originating from another electronic switching office are handled in the following manner. Trunk seizure by the originating office, which appears as an off-hook condition in the receiving office at the incoming trunk circuit ITC1, is sensed by means of the scanner S1 during a periodic scanning operation which is performed approximately once every 100 milliseconds. Upon interpreting the scanning and ascertaining that the off-hook condition represents an origination request, the central control CC selects an idle dial pulse receiver, such as DPR, generates command pulses for the trunk link network TLN for the establishment of connections from the incoming trunk circuit ITC1 via the wire junctors WJ to the selected dial pulse receiver, and causes the incoming trunk circuit ITC1 to be put into the BYPASS state for dial pulse receiving. Upon the establishment of all the desired connections, a signal, which indicates readiness to receive dial pulse information, is sent to the originating office. Thereafter, the originating office transmits the dial pulse information over the seized incoming trunk, and the dial pulse information received from the incoming trunk in the receiving office is routed to the selected dial pulse receiver via the incoming trunk circuit and the established path in the trunk link network.

The dial pulse receiver DPR employed in this illustrative embodiment comprises circuitry for causing current to flow in the control windings of a ferrod scanning element in response to dial pulse signals. The ferrod scanning element employed herein is disclosed in the U. S. Pat. of J. A. Baldwin and H. F. May, No. 3,175,042. The ferrod element comprises an apertured stick of ferromagnetic material having control, interrogate and readout windings. The interrogate and readout windings are connected to the master scanner MS, and the master scanner periodically interrogates the ferrod in response to commands from the central control CC. An interrogate pulse applied to the ferrod produces an output on the readout winding only if the ferromagnetic material is not saturated, i.e., if no current is flowing in the control winding of the ferrod. The central control CC causes the master scanner MS to scan the ferrod associated with a dial pulse receiver at a rate sufficiently high to assure that all dial pulse signals are detected by the system. As each dial pulse is received, it is detected at the dial pulse receiver and stored in the call store CS by the central control CC. Upon receipt of all digits, the central control CC interprets the dial pulse information and controls the various elements of the system to perform other functions required to complete the call. If the call is to local customer, the central control CC causes a ringing current to be applied to the desired subscriber' s line, and causes the incoming trunk circuit to be connected to the subscriber's line with when the subscriber answers. If the call is directed to another office, the central control CC seizes an idle outgoing trunk, transmits the dial pulse information over the seized trunk, and establishes a communication path from the incoming trunk to the seized outgoing trunk.

In accordance with our invention, telephone calls originating from an office of the step-by-step type are handled in a similar manner to those originating from another electronic office, i.e., trunk seizure is detected by means of the scanner S1, an idle dial pulse receiver such as DPR is selected, and appropriate connections are made in the trunk link network TLN to connect the incoming trunk circuit to the selected dial pulse receiver. However, since a step-by-step system does not expect a readiness signal from the receiving office, none is sent. It is characteristic of a step-by-step system that the first few digits dialed by a subscriber are employed to seize an outgoing trunk and all that that all subsequently dialed digits are transmitted over the seized trunk as the customer dials them. The time lapse between the seizure of the trunk and the transmittal of the first dial pulse is somewhat less than an interdigital period, since some time is consumed by the step-by-step office in searching for and seizing the outgoing trunk.

The time period between the appearance of a seizure signal at the receiving office and the arrival of the first dial pulse is considerably shorter than the time normally required for detection of the seize seizure signal, selection of an idle dial pulse receiver, and establishment of the required connections in the trunk link network TLN. Therefore, steps must be taken to avoid loss or mutilation of any dial pulses which arrive before the connection to the dial pulse receiver is made. In accordance with this invention, all dial pulses received from an incoming trunk connected to a step-by-step office are delayed at the incoming trunk circuit for a predetermined period of time which is sufficiently long to assure that no dial pulses reach the output of the incoming trunk circuit until the connection to the dial pulse receiver has been made.

Figures 2, 2A:
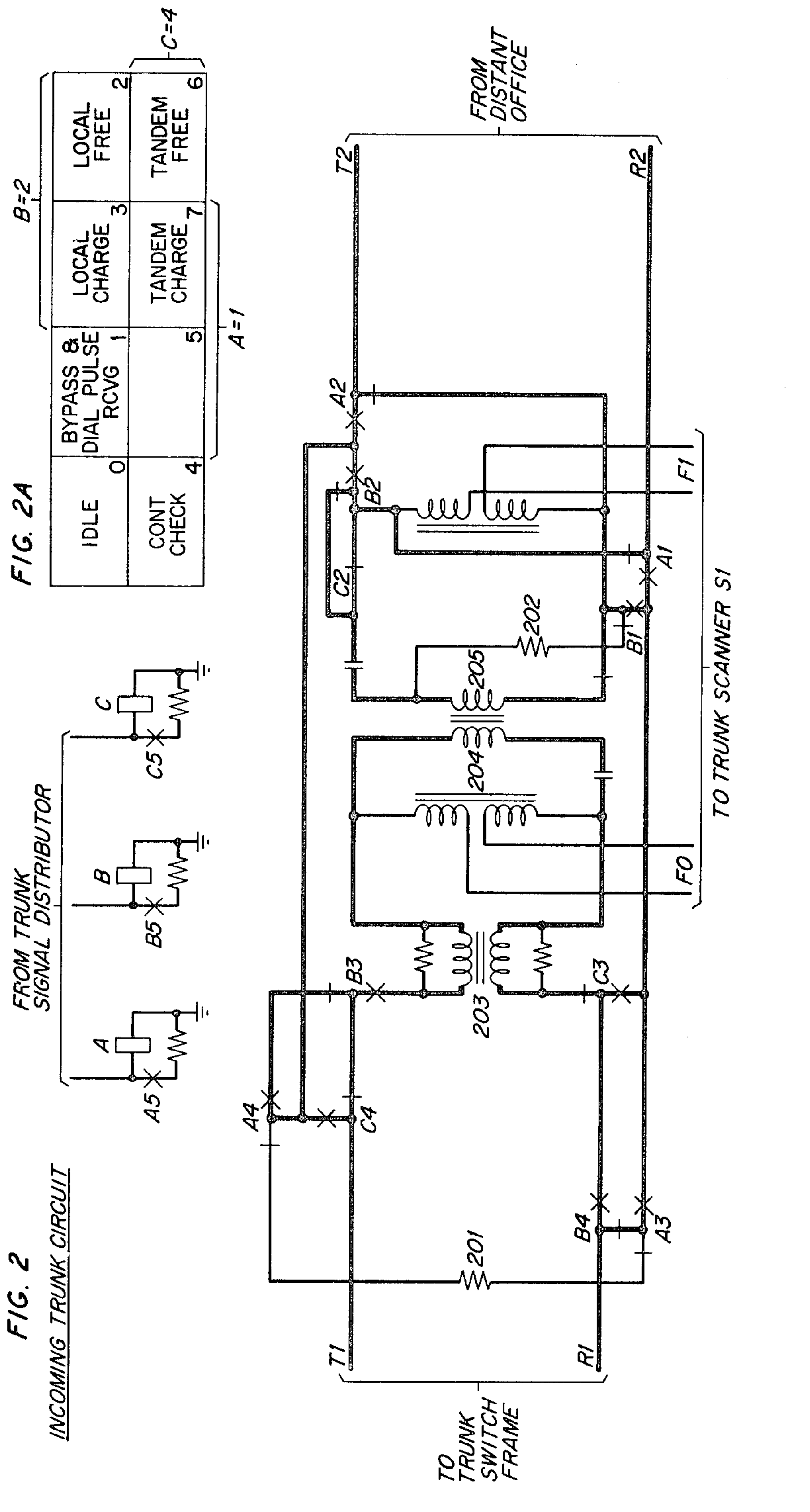
FIG. 2 is a detailed representation of a multistate incoming trunk circuit of the type employed in communication with other electronic switching offices.
FIG. 2A is a state diagram shown showing the various states of the incoming trunk circuit of FIG. 2, and the relationship between the states of the trunk circuit and the state relays.
Figures 3, 3A:
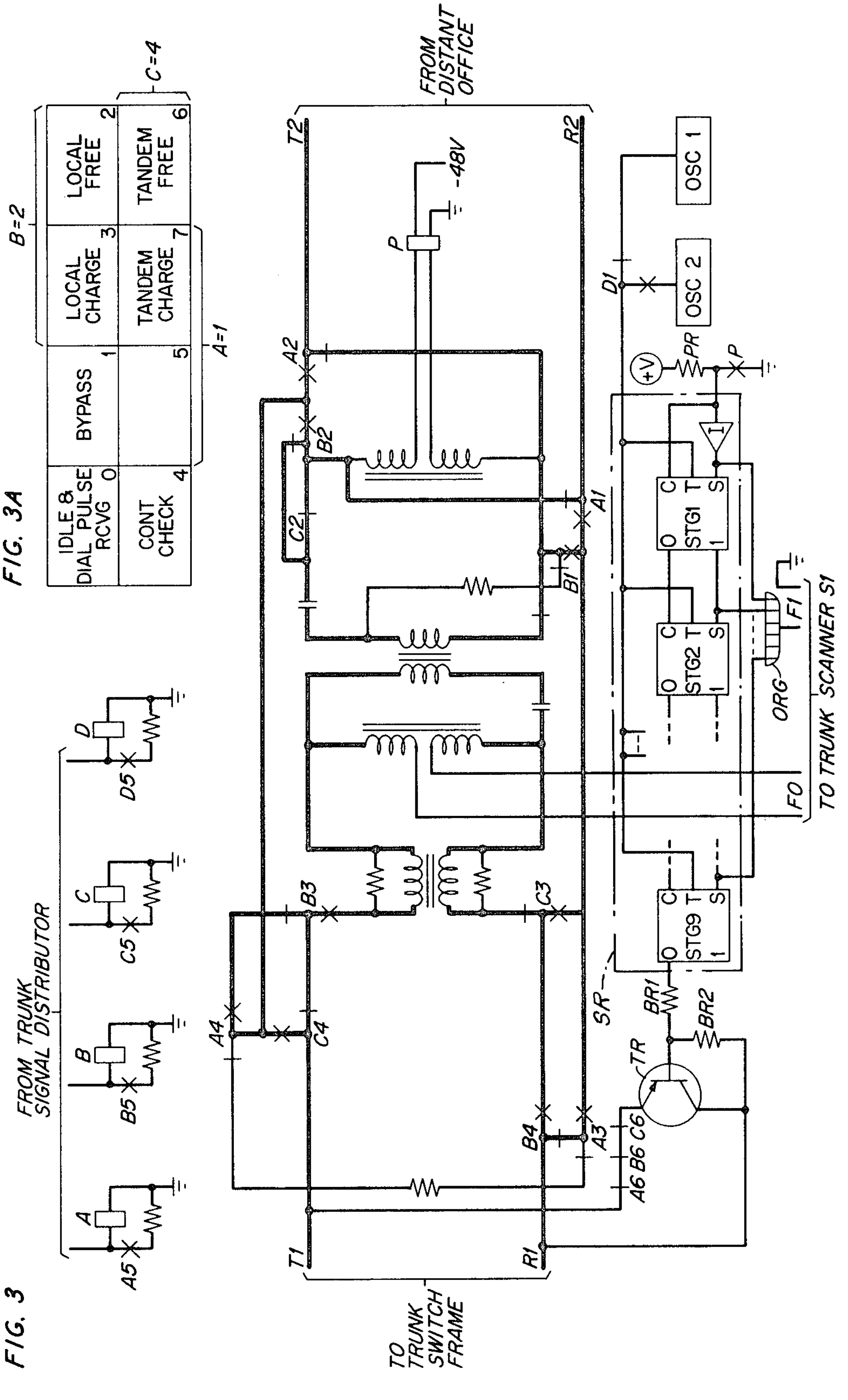
FIG. 3 shows a shift register delay means connected to an incoming trunk circuit of the type shown in FIG. 2.
FIG. 3A is a state diagram of the trunk circuit of FIG. 3.

An incoming trunk circuit of the type employed in communication with other electronic offices is shown in FIG. 2. This is a multistate trunk circuit which may be placed in one of several operational states as defined in FIG. 2A. For example, the trunk circuit is in the IDLE state when the incoming trunk is idle, is in the BYPASS state during dial pulse receiving, and is in yet another state for speech transmission. In this illustrative embodiment of our invention, delay at an incoming trunk circuit which is connected to a step-by-step office is obtained by means of a multistate shift register delay circuit which is permanently connected in parallel with an incoming trunk circuit as shown in FIG. 3. The trunk circuit shown in FIG. 3 is identical to the trunk circuit shown in FIG. 2, and FIG. 3A is a state diagram similar to FIG. 2A. The two state diagrams differ in that a trunk circuit used in communication with a step-by-step office, and connected to a shift register delay element as shown in FIG. 3, is not placed in the BYPASS state during dial pulse receiving but remains in the IDLE state.

Figure 4:
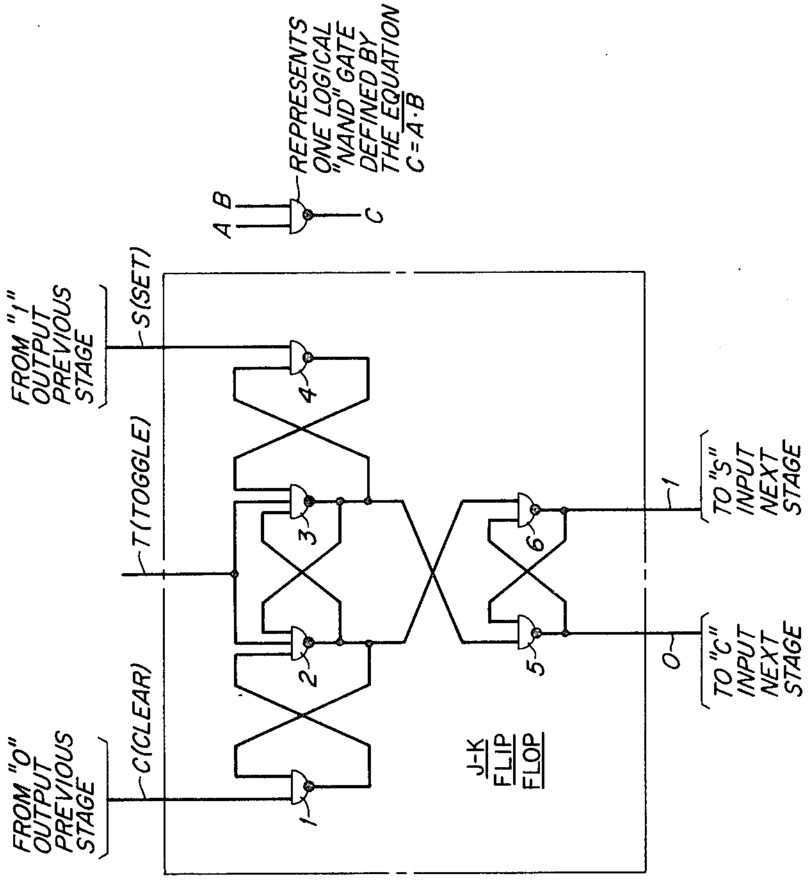
FIG. 4 is a schematic diagram of a single flip-flop stage of the shift register of FIG. 3 in which the elements of the flip-flop are represented by logic gates.

Each state of the shift register of FIG. 3 comprises a flip-flop of the type shown in FIG. 4 which flip-flop is sometimes referred to as a J-K flip-flop. The stages of the shift register are interconnected in such a manner that the O and 1 outputs of a stage are connected to the clear and set inputs of the succeeding stage. Information in the form of logical 1 and logical O is continually advanced through the shift register under control of advance pulses applied to the toggle input T of each stage of the shift register. As shown in FIG. 3, the output of the shift register delay circuit is connected to the output of the incoming trunk circuit; and the input of the delay circuit, which is the first stage of the shift register, is controlled by a dial pulse relay P which is connected to the incoming trunk circuit and which is responsive to on-hook and off-hook signals from the incoming trunk. As each dial pulse arrives, the dial pulse relay P causes the input to the first stage of the shift register to be changed to reflect a change in state of the incoming trunk, and advance pulses cause the changed input of the first stage to be shifted into the shift register In this manner, an image of the series of incoming dial pulses is advanced through the shift register and, after a predetermined period of delay, appears at the output of the incoming trunk circuit for transmission to a selected dial pulse receiver. Other actions of the receiving office, such as storing and translating the dialed digits, establishing further connections, etc., all progress independently of whether or not the originating office is a step-by-step office.

The period of time by which the image of the pulse train is delayed is a function of variables, namely, the number of stages of the shift register and the frequency of shifting. The frequency of shifting determines the amount of delay introduced by each stage of the shift register. For example, if an advance pulse with a repetition rate of 25 pulses per second is used, the delay introduced by each stage of the shift register is 40 milliseconds. Hence, a 10-stage shift register using such an advance pulse introduces a total delay of 400 milliseconds. It is well known from Information Sampling Theory that in order to detect all pulses of a pulse train the pulses must be sampled at a rate of at least twice the pulse frequency. Thus, dial pulses having a nominal rate of 10 pulses per second must be sampled with a sampling pulse of at least 20 pulses per second. However, it is common for dial pulses to have a "break" or on-hook period which is somewhat longer than the "make" or off-hook period. Accordingly, a higher sampling frequency must be employed when sampling dial pulses than when sampling a uniform pulse train. In the system, in accordance with our invention, the repetition rate of the advance pulse corresponds to the sampling frequency, and an advance pulse with a repetition rate of not less than 30 pulses per second is employed to sample dial pulses having a nominal rate of 10 pulses per second.

The time required in the receiving office for the detection of a seizure signal from an incoming trunk, selection of an idle dial pulse receiver, and the establishing of connections from the incoming trunk circuit to a selected dial pulse receiver dictates the amount of delay which must be introduced by the shift register. Furthermore, the time required for the completion of the connections in the receiving office is a function of the traffic load of the office. When the traffic load is heavy, a greater demand is made on the central processor which therefore reacts more slowly to a particular request such as a seizure signal from an incoming trunk. In accordance with the system of the previously noted Doblmaier et al. application, the electronic telephone-switching system periodically performs dial tone tests which serve to determine the period of time required by the system to establish a test dial tone connection, and which provide a measure of the traffic load on the system. In this illustrative embodiment of our invention, two separate pulse sources are employed to generate advance pulses for the shift register. The first pulse source generates advance pulses having a high repetition rate, and the second pulse source generates advance pulses having a lower repetition rate. Under normal traffic conditions the shift register is advanced under control of the first pulse source which generates pulses having a high repetition rate. When the system detects a heavy traffic condition, control of the shift register is changed from the first pulse source to the second pulse source which generates advance pulses having a lower repetition rate. As a result, the delay through the shift register is increased and a greater period of time is available for establishing a connection to an idle dial pulse receiver.

DETAILED DESCRIPTION

A multistate incoming trunk circuit of the type employed in the system of the previously noted Doblmaier et al. application for communication with switching systems other than step-by-step is shown in FIG. 2. A discussion of that trunk circuit is included herewith to aid in understanding our invention. The trunk circuit is controlled by operation of three state relays A, B, and C which are controlled from the signal distributor SD in response to commands from the central control CC.

When an incoming trunk is idle, the corresponding incoming trunk circuit is in the IDLE state in which all three of the relays A, B, and C are in the nonoperated state. Seizure of an idle trunk at the originating office completes a conductive path, via the seized trunk, between the terminals T2 and R2 of the corresponding incoming trunk circuit. A source of potential, which is connected to input F1 of the incoming trunk circuit through the control winding of a ferrod-scanning element, causes current to flow through the conductive path completed by the seizure and through the control winding of the ferrod-scanning element. The ferrod-scanning element is of the type previously described herein and current flow through the control winding brings the ferrod element into the saturated state which is detected upon interrogation by means of the scanner S1. The central control CC causes the scanner S1 to interrogate the ferrod element of each incoming trunk circuit approximately once every 100 milliseconds. Upon interpreting the scanning result and establishing that the indication obtained by the scanner is representative of an origination request, the central control generates various commands to effect the establishment of a path through the trunk link network connecting the output T1–R1 of the incoming trunk circuit to an available dial pulse receiver. Furthermore, the central control CC generates commands which cause the signal distributor SD to operate the relay A in the trunk circuit. As can be seen from FIG. 2A, operation of the relay A changes the trunk circuit from the IDLE state to the BYPASS state. Operation of the relay A causes the connection from F1 to T2–R2 to be broken, and a direct connection to be established from T1–R1 to T2–R2 by closure of make contacts A2 and A4 and make contacts A1 and A3. A potential source in the dial pulse receiver causes current to flow through the trunk link network, through the incoming trunk circuit, and through the incoming trunk. However, the current flow originating from the dial pulse receiver has a direction opposite to the current flow originating from the trunk circuit input F1. Thus, current flow in the trunk circuit is reversed when the incoming trunk circuit is changed from the IDLE state to the BYPASS state. This current reversal, which is sensed in the originating office, serves to indicate that the receiving office is ready to receive dial pulse information.

After the dial pulse information has been received and translated by the central control CC, the signal distributor SD places the incoming trunk circuit in selected other states by operation of the state relays A, B, and C in accordance with commands generated by the central control. The sequence of states in which the trunk circuit is placed during the progress of a call depends on whether the call terminates in this office (i.e., a local call) or whether the call is intended for another office (i.e., a tandem call). The sequence for local calls is as follows: 0-1-0-2-3-2-0. The sequence for tandem calls is as follows: 0-1-0-4-6-7-6-4-0. The states of the incoming trunk circuit and the condition of the circuit in each of these states is enumerated blow below.

State: 0 — IDLE — trunk terminated in resistor 202, trunk loop (T2–R2) closed, supervisory ferrod (F1) connected, and path to network (T1–R1) open;

State: 1 — BYPASS — all circuit elements of the trunk removed from the transmission path, conductors T2 and R2 connected to conductors T1 and R1;

State: 2 — LOCAL FREE — trunk loop (T2–R2) closed and unterminated, supervisory ferrod (F1) on trunk side connected and battery in the normal polarity; subscriber's supervisory ferrod (F0) connected and the transformer 205 included in the circuit, coil 203 compensates for return loss variation due to variations in subscriber loops;

State: 3 — LOCAL CHARGE — circuit arranged as in state 2 except that the polarity of the battery which is connected to the trunk via the trunk supervisory ferrod (F1) is reversed;

State: 4 — CONTINUITY CHECK — trunk terminated in resistor 202, trunk loop (T2–R2) closed and the trunk supervisory ferrod (F1) connected, path to network (T1–R1) completed and bridged with resistor 201;

State: 5 — NOT USED

State: 6 — TANDEM FREE — truck loop (T2–R2) closed and unterminated, supervisory ferrod (F1) of trunk connected battery normal polarity; path to network (T1–R1) closed, subscriber supervisory ferrod (F0) not connected, transformer C disconnected from transmission path;

State: 7 — TANDEM CHARGE — circuit as in state 6 except that battery to trunk circuit as supplied by the associated supervisory ferrod is of reversed polarity.

In accordance with one embodiment of our invention, an incoming trunk circuit of the type shown in FIG. 2 is employed in conjunction with a shift register delay circuit and signal present indicating circuitry for communication with direct progressive switching systems such as step-by-step. This arrangement will be described herein with reference to FIG. 3. The shift register delay circuit comprises nine flip-flop stages of the type shown in FIG. 4. As shown in FIG. 3, a dial pulse relay P, which is connected to the incoming trunk via the incoming trunk circuit, controls the input to the first stage of the shift register delay circuit. The signal present indicating circuitry ORG causes a ferrod-scanning element to be saturated when the incoming trunk is seized. Seizure is detected in the central control CC by interrogation of the ferrod element by means of scanner S1. The output of the last stage of the shift register is connected to the output T1–R1 of the incoming trunk circuit through the combination of the resistors BR1 and BR2, the transistor TR, and the relay contacts A6, B6, and C6.

Advantageously, the flip-flop arrangement, employed in this illustrative embodiment and shown in FIG. 4, comprises only logic gates and may be easily manufactured as an integrated circuit. Each of the transistor gate circuits 1 through 6 represents a NAND gate. The output of the NAND gate is high (i.e., at a positive potential) when one or more of the inputs to the NAND gate is low (i.e., at or near ground potential); and the output of the NAND gate is low when all of its inputs are high. A positive potential advance pulse applied to the toggle input T causes the flip-flop to assume a next state in accordance with the input which exists at the set and clear input terminals S and C at the time the leading edge of the advance pulse arrives. The flip-flop assumes the 1 state (i.e., the output terminal 1 is high and the output terminal 0 is low) if the input is logical 1 when the advance pulse is applied to the input T; and the flip-flop assumes the 0 state (i.e., the output terminal 1 is low and the output terminal 0 is high) if the input is logical 0 when the advance pulse is applied to the input T. Logical 1 at the input is defined herein as a positive potential at the set input terminal S and ground potential at the clear input terminal C; and logical 0 is defined as ground potential at the input terminal S and a positive potential at the input terminal C. As shown in FIG. 4, when logical 1 is applied to the input terminals S and C in the absence of a positive potential advance pulse on terminal T, the output of each of the transistor gate circuits 1, 2, and 3 is high and the output of gate circuit 4 is low. When a positive pulse is applied to the input T under such a condition, the output of gate circuit 2 becomes low since all three inputs of gate circuit 2 are high. The low output of gate circuit 2 applied to the inputs of gates 1 and 3 forces the outputs of these gates to remain high for the duration of the pulse applied to terminal T. Thus, any change occurring at the input terminals S and C after the pulse has been applied to the input terminal T will not affect the next state of the flip-flop.

The low output of gate 2 together with the high output of gate 3 forces the output of gate 6, which is the 1 terminal of the flip-flop, to be high and the output of gate 5, which is the 0 terminal of the flip-flop, to be low. Thus, the flip-flop assumes the 1 state if logical 1 exists at the input when the advance pulse arrives. Similarly, the flip-flop assumes the 0 state if logical 0 exists at the input when the advance pulse arrives. Logical 0 at the input causes the outputs of gates 2, 3, and 4 to be high and causes the output of gate 1 to be low. When the positive potential advance pulse arrives, the output of gate 3 becomes low while the outputs of gates 2 and 4 remain high. As a result, the output of gate 6, which is the 1 terminal of the flip-flop, is forced low and the output of gate 5, which is the 0 terminal of the flip-flop, is forced high.

As shown in FIG. 3, the clear input C of the first stage of the shift register is connected to ground through a normally open contact of the dial pulse relay P such that a positive potential is applied to the clear input C via resistor PR when the relay P is in its nonoperated state and ground potential is applied when the relay P is in its operated state. The set input S of the first stage is connected to the clear input through an inverter I to assure that the set input has polarity opposite to that of the clear input. Hence, logical 1 is applied to the input when the relay P is operated since ground potential is applied to the clear input C and positive potential is applied to the set input S. Conversely, logical 0 is applied to the input when the relay P is in its nonoperated state. Information in the form of logical 1 or logical 0 is continuously inserted into and advanced through the shift register under control of advance pulses generated by one of the two pulse sources, OSC1 and OSC2, which are selectively connected to the toggle input T of each stage of the shift register under control of relay D.

In the absence of seizure or dial pulse signals, the dial pulse relay P e remains in its nonoperated state and logical 0 is continuously advanced through the shift register, i.e., all stages of the shift register are in the 0 state. When an idle trunk is seized at the step-by-step office, the incoming trunk assumes the off-hook state which appears as a short circuit across the input T2–R2 of the incoming trunk circuit. Consequently, the relay P is operated and the input to the first stage of the shift register is changed to logical 1 which is inserted into the shift register under control of the advance as long as relay P remains operated. A dial pulse on an incoming trunk consists of an on-hook or open circuit condition for a specified period of time followed by an off-hook or short circuit condition for another specified period of time. After the trunk has been seized, arrival of the first dial pulse is evidenced by an on-hook condition on the trunk which causes the relay P to change from its operated to its nonoperated state and logical 0 to be inserted into the shift register. At the end of the on-hook or break period of the dial pulse, the relay P is returned to its operated state and logical 1 is inserted into the shift register until the break period of the next succeeding dial pulse. After all digits have been transmitted and during the interdigital time periods the trunk is in the off-hook state, and logical 1 is inserted into the shift register to represent these periods.

As previously described, the signal present indicating circuit ORG causes a ferrod scanning element associated with the trunk scanner S1 to become saturated when the trunk is seized and keeps the ferrod in the saturated state during dial pulse receiving. In order to maintain the scanner ferrod in the saturated state during dial pulsing, when the contacts of the relay P are alternately opened and closed, the OR gate ORG is connected to the input of each stage of the shift register. The input of the first stage directly reflects the operational state of the relay P, while the inputs to the subsequent stages reflect the recent past state of the relay P. Hence, the OR gate ORG causes the ferrod scanner to become saturated as soon as the relay P is operated in response to trunk seizure and maintains the ferrod in the saturated state as long as a logical 1 remains in the shift register.

The ferrod-scanning element controlled by the signal present indicating circuit ORG is scanned at the same rate as the scanning elements of non-step-by-step trunks of the system (i.e., approximately once every 100 milliseconds). Upon interpreting the results of a scanning operation and finding that an incoming trunk from a step-by-step office has been seized, the central control CC generates the various commands required to establish a path from an available dial pulse receiver through the trunk link network TLN to the output T1–R1 of the corresponding incoming trunk circuit. However, in the case of an incoming trunk from a step-by-step office, the central control does not generate commands for the signal distributor SD to change the corresponding incoming trunk circuit to its BYPASS state but leaves the incoming trunk circuit in the IDLE state during dial pulse receiving. Connecting a dial pulse receiver to the incoming trunk circuit via the trunk link network TLN causes the potential of a potential source in the dial pulse receiver DPR to appear across the trunk circuit output T1–R1. However, since the trunk circuit is in the IDLE state, no current flows into the trunk circuit and current can flow between T1 and R1 only when the transistor TR is in the ON state, in which current is allowed to flow between the collector and the emitter of the transistor. Current flow between the terminals T1 and R1 and through the path established through the trunk link network TLN is sensed in the dial pulse receiver DPR and appears as an off-hook condition at the dial pulse receiver.

Operation of the transistor TR is controlled by the output of the last stage STG9 of the shift register. The output of the last stage of the shift register is connected to the base of the transistor TR by means of the resistors BR1 and BR2 which have resistance values such that current will flow out of the base of the transistor only when the last stage STG9 is in the 1 state. Hence, the transistor is in the ON state when the last stage is in the 1 state. Relay contacts A6, B6, and C6 are inserted in series with the transistor TR to assure that the transistor affects the output T1–R1 only when the trunk circuit is in the IDLE state.

In summary, when a previously idle incoming trunk assumes the off-hook condition, the relay P is operated, the ferrod-scanning element controlled by the signal present indicating circuit ORG becomes saturated, and logical 1 is inserted into the shift register. Upon detection of the saturated condition of the ferrod-scanning element, the central control causes a connection to be established from the incoming trunk circuit to a dial pulse receiver, and a potential is applied across the terminals T1 and R1. When logical 1 reaches the last stage STG9 of the shift register, the transistor TR is turned on allowing current flow between T1 and R1 which is sensed in the dial pulse receiver and which appears as an off-hook condition at the dial pulse receiver.

Thus, there appears to be a direct connection from the incoming trunk to the dial pulse receiver and the dial pulse receiver receives information identical to that appearing on the incoming trunk but delayed by a period of time which is equal to the delay introduced by the shift register. Functions such as counting of dial pulses, detection of timeout, or abandonment of a call are performed by the system by utilizing the information obtained from the dial pulse receiver. After the last pulse of the last digit has been received, the system performs selected other functions required to complete the call including changing the state of the incoming trunk circuit from IDLE to a selected one of the other operational states. As a result of operating the state relays of the incoming trunk circuit, the transistor TR is disconnected from the terminal T1 of the incoming trunk circuit and the shift register delay circuit is prevented from interfering with the communication path.

In accordance with our invention, the delay introduced by the shift register is varied in accordance with the traffic load of the system. In this illustrative embodiment of our invention, two distinct pulse sources OSC1 and OSC2 are employed, each generating advance pulses of a predetermined repetition rate. Pulse source OSC1 generates advance pulses having a repetition rate of 60 pulses per second and is normally connected to the shift register through the normally closed contact D1 of the relay D. Under normal traffic conditions, the 150 millisecond delay period produced by the nine-stage shift register of FIG. 3 under control of the pulse source OSC1 is sufficient to assure the establishment of a connection from the incoming trunk circuit to a dial pulse receiver before dial pulse information reaches the last stage of the shift register. When an abnormally heavy traffic condition is detected in the system, the delay produced by the shift register is increased to 300 milliseconds by employing advance pulses having a repetition rate of 30 pulses per second which are generated by the pulse source OSC2. As shown in FIG. 3, the pulse sources OSC1 and OSC2 are disconnected from and connected to the shift register by operation of relay D which is controlled by means of the signal distributor SD.

It is to be understood that the above-described arrangement is merely illustrative of the application of the principles of the invention; numerous other arrangements may be devised by those skilled in the art without departing from the spirit and scope of the invention.

We claim:

1. In a communication switching system:

a plurality of incoming trunks;

pulse-receiving means;

timing means for selectively defining a predetermined period of time;

delay means associated with at least certain of said trunks for delaying all incoming pulses by said predetermined period of time;

means for selectively connecting said delay means to said pulse receiving means; and means responsive to signals appearing on each of said trunks to control said connecting means.

2. In a communication switching system:

a plurality of incoming trunks;
pulse-receiving means;
delay means associated with at least certain of said trunks for delaying all incoming pulses by equal predetermined periods of time, said delay means comprising a multistage shift register;
a pulse source for generating advance signals for controlling said shift register;
means for selectively connecting said delay means to said pulse-receiving means; and
means responsive to signals appearing on each of said trunks to control said connecting means.

3. A communication-switching system in accordance with claim 2 wherein said pulse source includes means for generating advance signals having selected repetition rates dependent upon the traffic load of the system.

4. In a telephone switching system:
a plurality of incoming trunks;
a plurality of pulse-receiving means;
connecting means operative to selectively interconnect said incoming trunks and said pulse receiving means;
means responsive to signals appearing on each of said trunks to control said connecting means; and
delay means in each of said trunks for delaying all incoming pulses for an equal predetermined period of time, said period of time being greater than the time required for the selective interconnecting of one of said plurality of incoming trunks to one of said plurality of pulse receiving means.

5. In a telephone system:
a plurality of incoming trunks;
a plurality of corresponding incoming trunk circuits;
a plurality of dial pulse receivers;
connecting means responsive to control signals for selectively connecting said incoming trunk circuits to said dial pulse receivers;
means responsive to signals appearing on each of said incoming trunks for applying said control signals to said connecting means; and
wherein the improvement comprises shift register means in each of said incoming trunk circuits for delaying all dial pulses received on said corresponding incoming trunk by an equal predetermined period of time.

6. An incoming trunk circuit for a communication switching system comprising:
first conductor means for connecting said trunk circuit to a distant office;
second conductor means for connecting said trunk circuit to a switching network;
shift register means having a plurality of stages;
pulse-repeating means responsive to pulses appearing on said first conductor means for applying input signals to the first of said stages;
means for applying advance pulses to said stages;
means controlled by the last of said stages for applying output pulses to said second conductor means; and
means responsive to said pulse-repeating means and to a plurality of the stages of said shift register for generating a control signal for the switching network.

7. An incoming trunk circuit in accordance with claim 6 wherein said advance pulse-applying means includes means for generating advance pulses at different selected rates.

8. An incoming trunk circuit in accordance with claim 6 further comprising means defining a plurality of states of the trunk circuit and means for disconnecting said output pulse-applying means from said second conductor means when the trunk circuit is in other than a dial pulse-receiving state.

9. An incoming trunk circuit in accordance with claim 8 wherein said pulse-repeating means includes a relay having a winding connected across said first conductor means and a contact of said relay connected to said first stage, said means defining a plurality of states includes state relays, said output pulse-applying means includes a transistor connected across said second conductor means, and said disconnecting means includes contacts of each of said state relays.

10. In a communication system:
a plurality of incoming trunks;
a corresponding plurality of incoming trunk circuits;
a plurality of dial pulse receivers;
connecting means responsive to control signals for selectively connecting said incoming trunk circuits to said dial pulse receivers;
means in each of said trunk circuits responsive to seizure signals received from said corresponding incoming trunk for generating connection request signals;
means responsive to said connection request signals for generating said control signals for said connecting means;
shift register means in each of said incoming trunk circuits for delaying by an equal period of time all dial pulses received from said corresponding incoming trunk; and
means responsive to the traffic load of the system for defining said period of time.